United States Patent [19]

Kaufman et al.

[11] Patent Number: 4,873,467

[45] Date of Patent: Oct. 10, 1989

[54] ION SOURCE WITH PARTICULAR GRID ASSEMBLY

[76] Inventors: Harold R. Kaufman, 5920 Obenchain Rd., La Porte, Colo. 80535; Raymond S. Robinson, Bradbury Ct., Fort Collins, Colo. 80521

[21] Appl. No.: 197,525

[22] Filed: May 23, 1988

[51] Int. Cl.[4] .......................... H01J 27/00; F02K 9/00

[52] U.S. Cl. .................................. 313/360.1; 313/268; 60/202

[58] Field of Search ...................... 313/360.1, 296, 297, 313/257, 268; 60/202

[56] References Cited

U.S. PATENT DOCUMENTS

| | | | |
|---|---|---|---|
| 2,916,649 | 12/1959 | Levin | 313/268 X |
| 3,758,806 | 9/1973 | Boström | 313/268 |
| 3,864,797 | 2/1975 | Banks | 29/25.18 |
| 3,913,320 | 10/1975 | Reader et al. | 60/202 |
| 3,914,969 | 10/1975 | Banks | 72/63 |
| 3,947,933 | 4/1976 | Banks | 29/25.18 |
| 3,952,228 | 4/1976 | Reader et al. | 315/111.8 |
| 3,956,666 | 5/1976 | Reader et al. | 315/111.8 |
| 3,969,646 | 7/1976 | Reader et al. | 313/359 |
| 4,749,912 | 6/1988 | Hara et al. | 313/360.1 |

OTHER PUBLICATIONS

*Guide to Operations for the 38-cm Ion Source* by Commonwealth Scientific Corp. 6/30/87.

"Low Specific Impulse Electric Thrusters" by Kaufman et al Jul. 1984.

"Design, Fabrication and Operation of Dished Accelerator Grids on a 30 cm Ion Thruster" by Rawlin et al, Apr. 1972.

"Dished Accelerator Gridson a 30 cm Ion thruster" by Rawlin et al Journal of Spacecraft and Rockets vol. 10, No. 1, Jan. 1973, pp. 29–35.

Characteristics of the Le RC/Hughes J-Series 30 cm Engineering Model Thruster by Collet t et al, 14 International Electric Propulsion COnference 10/30-11/1,1979.

Results of the Mission Profile Life Test by Bechtel et al, 16 International Electric Propulsion COnference 11/1982.

*Primary Examiner*—David K. Moore
*Assistant Examiner*—Sandra L. O'Shea
*Attorney, Agent, or Firm*—Hugh H. Drake

[57] ABSTRACT

An ion source has the typical chamber wherein ions are produced and caused to be propelled outwardly through at least a pair of grids which have a mutually-aligned respective plurality of apertures. Thus, there are the usual cathode, anode, magnet assembly, ionizable gas inlet and supporting power supplies as well as neutralizing means. First and second grids each have an integrally-formed peripheral marginal portion. A support element has a shape which matches and overlies the marginal portion of one grid, while a clamp has a shape which matches that of and overlies the other marginal portion. The support element and clamp are secured together. First and second mutually-aligned seats are successively spaced around the respective marginal portions. A plurality of insulators, each having of circular cross-section, are individually seated between the two different marginal portions in a manner to cause general alignment while enabling radial movement due to thermal expansion of the marginal portions relative to the support element and the clamp and each other.

17 Claims, 7 Drawing Sheets

ION SOURCE WITH PARTICULAR GRID ASSEMBLY

The present invention pertains to an ion source. More particularly, it relates to a grid assembly used therein. The source is intended to be useful in any of thrusting, etching, deposition or enhancement applications.

Early uses of ion sources were developed in connection with propulsion in outer space, as described in U.S. Pat. No. 3,156,090 and discussed in an article entitled "Technology of Electron-Bombardment Ion Thrusters" by H. R. Kaufman, Advances in Electronics and Electron Physics", Vol. 36, L. Martin Ed., Academic Press, New York, pp. 265–373 (1974). Thereafter, such ion sources began to find use in industrial fields such as in sputter etching and deposition. For background, reference may be made to U.S. Pat. Nos. 3,913,320, 3,952,228, 3,956,666 and 3,969,646.

Besides use either as a thruster or in depositing or removing material, such sources have now also found use in enhancement of the properties of a material being subjected to the ion beam. Actually, no limits to the possible utility have yet been defined.

While several different gridless ion sources are known, most ion sources heretofore used or otherwise reported in the literature employ a plurality of apertured grids disposed across the outlet of a discharge chamber in which an ion-producing plasma is contained. There typically is first a screen grid having apertures through which ions are withdrawn from the chamber by the influence of an apertured accelerator grid. The two grids are to be mutually aligned in an effort to prohibit impingement of the ions upon the accelerator grid during passage on outwardly to where they are utilized. In some cases, a third grid, beyond the accelerator grid, has been advantageously employed; it may be called either a decelerator grid or a suppressor grid.

A reading of the earlier literature, especially of the related patents, could make it appear that the field has matured. While most or all of that reported before did work, continued experience with the prior apparatus has revealed that many problems remain for solution before appropriate efficiencies, reliability, durability and the like are all obtained in this field.

It is, therefore, a rather general objects of the present invention to provide a new and improved ion source which at least contributes to the solution of some of those problems.

Problems that remain are well identified in connection with a very long project undertaken by the NASA Lewis Research Center. For background, reference should be made to "Design, Fabrication and Operation of Dished Accelerating Grid on a 30-CM Ion Thruster" by Rawlin et al, AIAA paper No. 72–486 (1972); "Dished Accelerator Grids on a 30-CM Ion Thruster", Journal of Spacecraft and Rockets, Vol. 10, No. 1, (1973) by Rawlin et al; "Characteristics of LeRC-/Hughes J -Series 30-CM Engineering Model Thruster" by Collett et at, AIAA paper No. 79–2077 (1979); "Results of Mission Profile Life Test", Bechtel et al, AIAA paper No. 82–1905 (1982) and "Low Specific Impulse Electric Thrusters", NASA Contract Report No. CR-174678, Kaufman et al, NASA Lewis Research Center, July (1984).

All of those papers pertain to problems of maintaining alignment and spacing between the grids by reason of expansion and contraction due to induced temperature changes. It was suggested to slot the grid margins in order to enable movement or to mount the marginal portions by means of flexible supports which yielded for radial movement of the grids. The recognition that a dished shape to the grids could be of assistance gave rise to a need for accurate ways of accomplishing the dishing of respective plurality of grids. That subject, it itself, was addressed by Banks in his U.S. Pat. Nos. 3,864,797, 3,914,969 and 3,947,933.

In the overall, the aforesaid publications indicate that substantial improvements have been made. At the same time, they reveal that significant room remains for further improvements. Misalignments as between successive grids have continued to occur, attempts at a solution have, in turn, brought about new problems and, in short, nothing resembling an ultimate answer has yet been found. That has led applicants to seek further in the quest of better construction for multi-grid ion sources.

The present invention pertains to an ion source of the type that has a chamber wherein ions are produced and propelled outwardly through at least a pair of grids having a mutually-aligned respective plurality of apertures. The grid assembly includes first and second grids each of conducting material and having integrally-formed peripheral marginal portions that have, inside of each marginal portion, an array of apertures distributed in a predetermined pattern. A support element has a shape which matches that of, and is mounted over the side of, the marginal portion of the first grid facing away from a second grid. A clamp has a shape which matches that of, and is mounted over the side of, the marginal portion of the second grid facing away from the first grid. Included are means for securing the clamp to the support element with the marginal portions sandwiched thereinbetween and respectively positioned to mutually align the respective ones of the apertures in the first and second grids. Defining a first and second mutually-aligned series of seats are means defined to be successively space-opposed around respective ones of the marginal portions. A plurality of insulators, each having a circular cross-section, or other cross-section suitable for self-alignment or positioning with the seats, are individually seated in and between corresponding ones of the first and second series of seats for enabling mutual radial movement of the marginal portions and movement relative to the support element and the clamp.

The features of the present invention which are believed to be patentable are set forth with particularity in the appended claims. The organization and manner of operation of the invention, together with further objects and advantages thereof, may best be understood by reference of the following description taken in connection with the accompanying drawings, in the several figures of which like reference numerals identify like elements, and in which:

Figure 1:
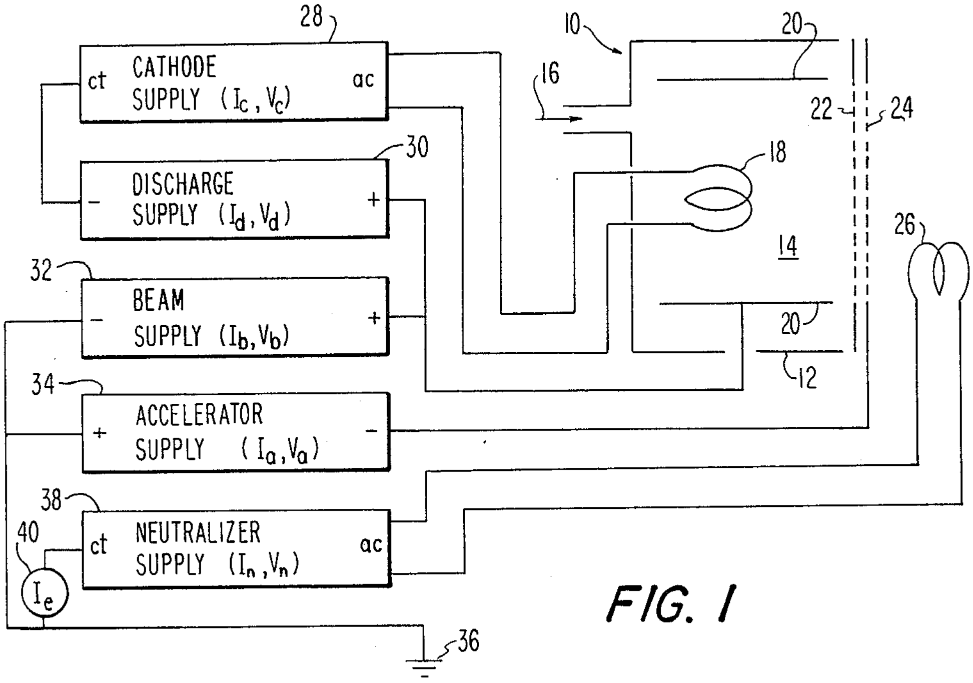
FIG. 1 is a schematic diagram of an ion source connected to suitable power supplies.

Referring now to FIG. 1, an ion source 10 includes an outer shell 12 which defines an interior chamber 14. An ionizable gas is introduced, as indicated by arrow 16, through a port into chamber 14. Within chamber 14 is disposed a cathode 18 and an anode 20. Mounted across the outlet of chamber 14 is a generally planar screen grid 22 beyond which, downstream in the direction of the ion source flow, is an apertured accelerator grid 24. Outwardly of accelerator grid 24 is a neutralizer cathode 26 that produces electrons to counter the positive charge of the ions and, therefore, assist in preventing the ion beam from spreading.

This much represents a fundamental approach in the field of ion sources. Cathode 18 is energized from an alternating current supply 28 the potential center of which is returned to the negative terminal of a discharge supply 30. The positive of discharge supply 30 is connected to anode 20. A beam supply 32 applies a positive potential to anode 20. The negative terminal of beam supply 32 is paralleled with the positive terminal of accelerator supply 34, with the negative potential from the latter being applied to accelerator grid 24 in order to draw the positive ions through screen grid 22. The positive terminal of accelerator supply 34 also is returned to system ground as indicated at 36. Neutralizer 26 is energized from supply 38.

Meters are normally provided for the voltages and currents of the supplies shown ($I_c$, $V_c$, etc.). Meter 40 is normally required in addition to the power supply meters in order to monitor the electron emission from neutralizer 26. Moreover, sophisticated implementation of the overall system will justify computer-type control with processing, including algorithms, to make interacting adjustments of the different supply components as operation variables change through a long period of time.

Figure 2:
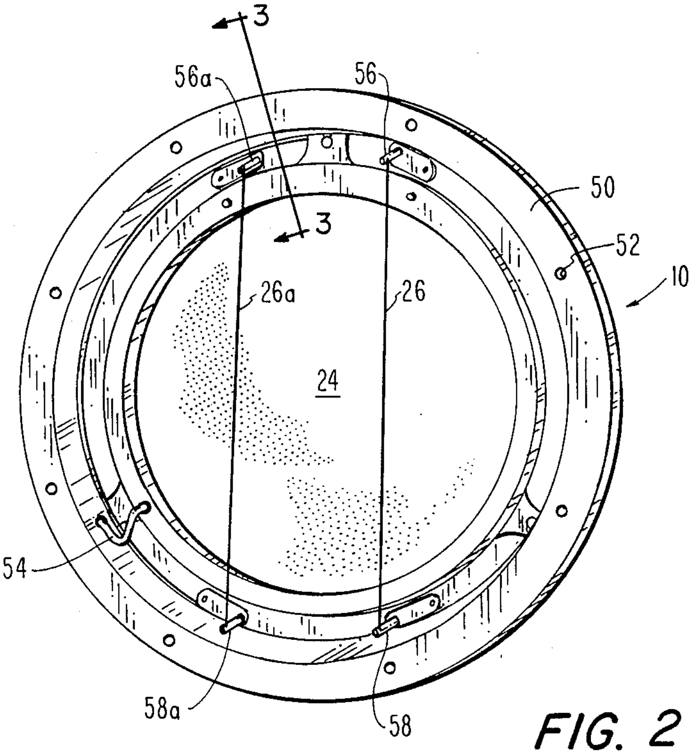
FIG. 2 is an end view of the ion beam outlet end of an ion source

In FIG. 2, the viewer is looking at an ion source 10 from a downstream location. Presented is a mounting flange 50 around the forward part of cylindrical outer shell 12 and which flange includes apertures 52 by means of which chamber 14 is fastened into the bulk of a vacuum system in which is contained the substrate or other article to be bombarded by the ions. When assembled with that bulk of the vacuum system, outer shell 12 also forms part of the vacuum chamber wall in this particular embodiment.

Also immediately present to view in FIG. 2 is accelerator grid 24 behind which is screen grid 22. A conductive lead 54 serves to connect grid 24 back to supply 34. Spaced in front of accelerator grid 24, spanning the distance between support and connecting posts 56 and 58, is neutralizer filament 26. Similarly spanning the distance between support and connecting posts 56*a* and 58*a* is a second neutralizer element 26*a*. In normal operation, only one of the neutralizer filaments is in use, the other being a spare.

Figure 3:
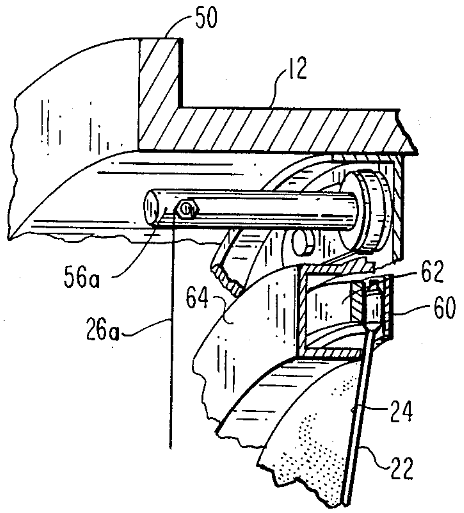
FIG. 3 is a fragmentary cross-sectional view taken along the line 3—3 in FIG. 2.

Certain details of the mounting of one of the neutralizer support posts are shown in FIG. 3. Also to be seen in FIG. 3 are grids 22 and 24 secured around their edges between a clamp 60 and a support element 62. Overlying support element 62 is a sputter cover 64.

Figure 4:
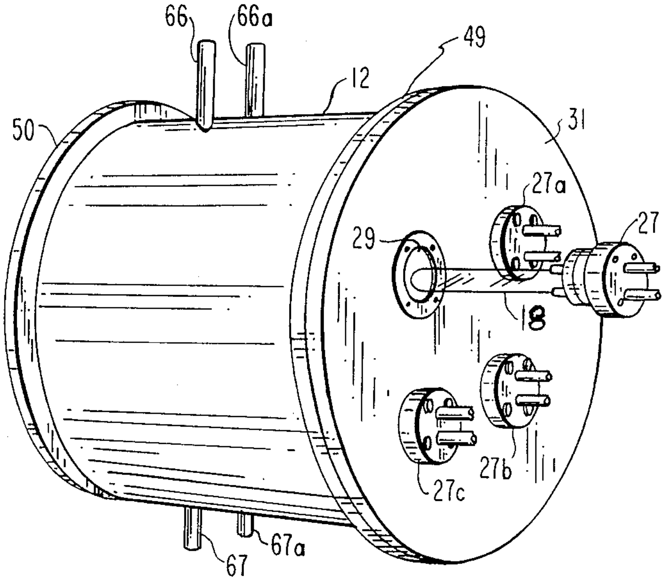
FIG 4 is an isometric view of one end of the ion source of FIG. 2 with a component removed outwardly.

FIG. 4 depicts a view from the rear side of the unit, showing a cathode filament 18 in a partially removed condition. Filament 18 is mounted to a base 27 securable through an opening 29 formed through an end plate 31 which is secured to flange 49 to form a portion of outer shell 12 for the assembled ion source. In principle, only one cathode filament is needed to serve as cathode 18 of FIG. 1 for operation. However, multiple cathode filaments operated in parallel serve to improve uniformity of the ion beam extracted from a large ion source. Multiple filaments also provide a redundancy to extend the lifetime in operation. In the prototype illustrated there are actually three additional filaments attached to cathode bases 27*a*, 27*b* and 27*c*.

Also shown in FIG. 4 are neutralizer connection posts 66, 66*a*, 67 and 67*a* which inlet to respective opposite ends of redundant neutralizer filaments 56 and 56*a*. Those connections could, of course, be made by way of many different routes, those shown simply being convenient.

Figure 5:
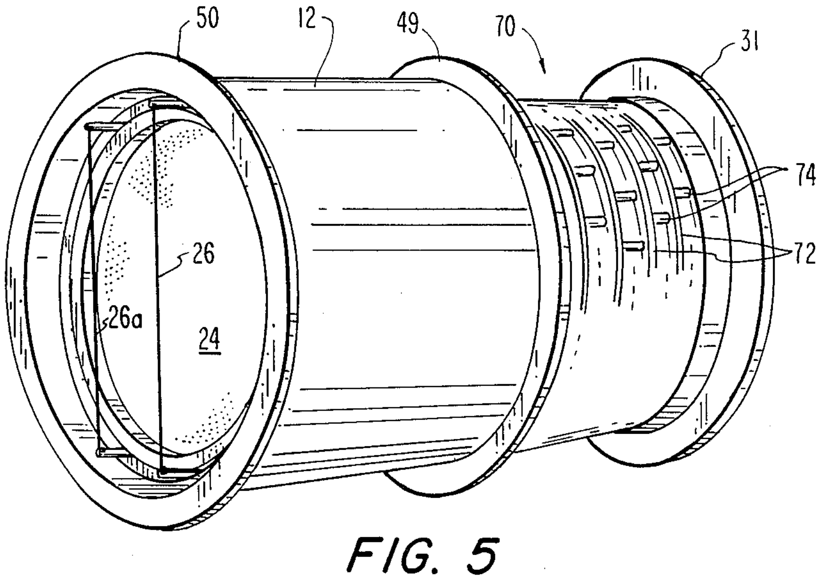
FIG. 5 is an isometric exploded view of the ion source of FIG. 2 with an outer shell partially removed.

In FIG. 5, cylindrical outer shell 12 has been partially withdrawn away from end plate 31 so as to reveal an interior cage 70 which is composed of a series of longitudinally-spaced rings 72 between each of which is a circumferentially-spaced array of magnets 74. Cage 70 is insulatingly supported from plate 31. In succession from back to front, magnets 74 are reversed as between each successive pair of rings 72. As now well understood from the prior art mentioned in the introduction, the magnets create a magnetic field within the interior of chamber 14 that enhances ionization for the development of a plasma, In a known alternative, an energized electromagnet surrounds chamber 14.

Figure 6:
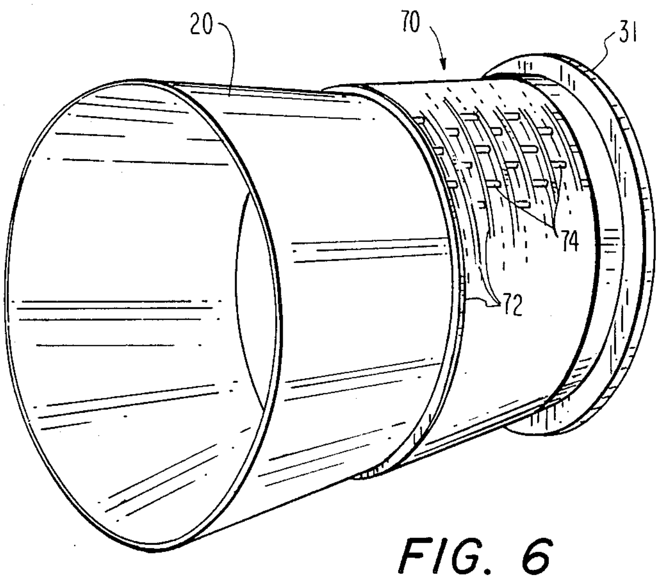
FIG. 6 is an isometric exploded view of the ion source of FIG. 2 with the outer shell removed and with an inner anode partially removed.
Figure 7:
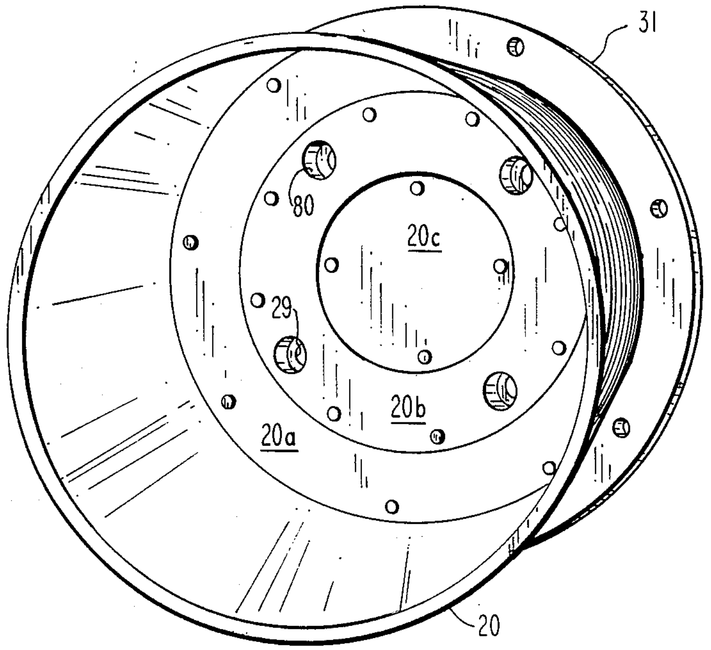
FIG. 7 is an isometric view of the interior of the anode assembly partially shown in FIG. 6.

FIG. 6 reveals the primary portion of anode 20 as partially removed from its operative location just inside magnet cage 70. As further illustrated in FIG. 7, however, the total extent of the anode includes not only its cylindrical portion 20 but also rear end wall portions 20*a*, 20*b* and 20*c* which are all electrically connected to portion 20. Cathode openings as at 80 are formed through portion 20*b* in alignment with the cathode filament openings as at 29. In order to represent both openings 80 and 29 in FIG. 7, opening 80 is shown as being in a relatively much thicker anode wall segment than actually is the case as compared with plate 31.

However actually fabricated, the whole purpose is to have a surrounding structure that cooperates with cathode 18 in order to produce an initial electron current which excites the formation of a plasma as well as to have all of that located inside a magnetic field which enhances the very same operation all to the end result of creating as intense a plasma as possible by way of utilization of the ionizable gas being introduced within chamber 14. With the exception of a portion of that shown in FIG. 3, nothing that has been described this far is truly new in principle nor restricted as to manner of implementation. A particular prototype has been illustrated, for the reason that it has been found to work. When dealing with fields, forces and movements of small particles that cannot be seen, it is important to relate those things that cannot be seen to hardware elements that are visible.

Figure 8:
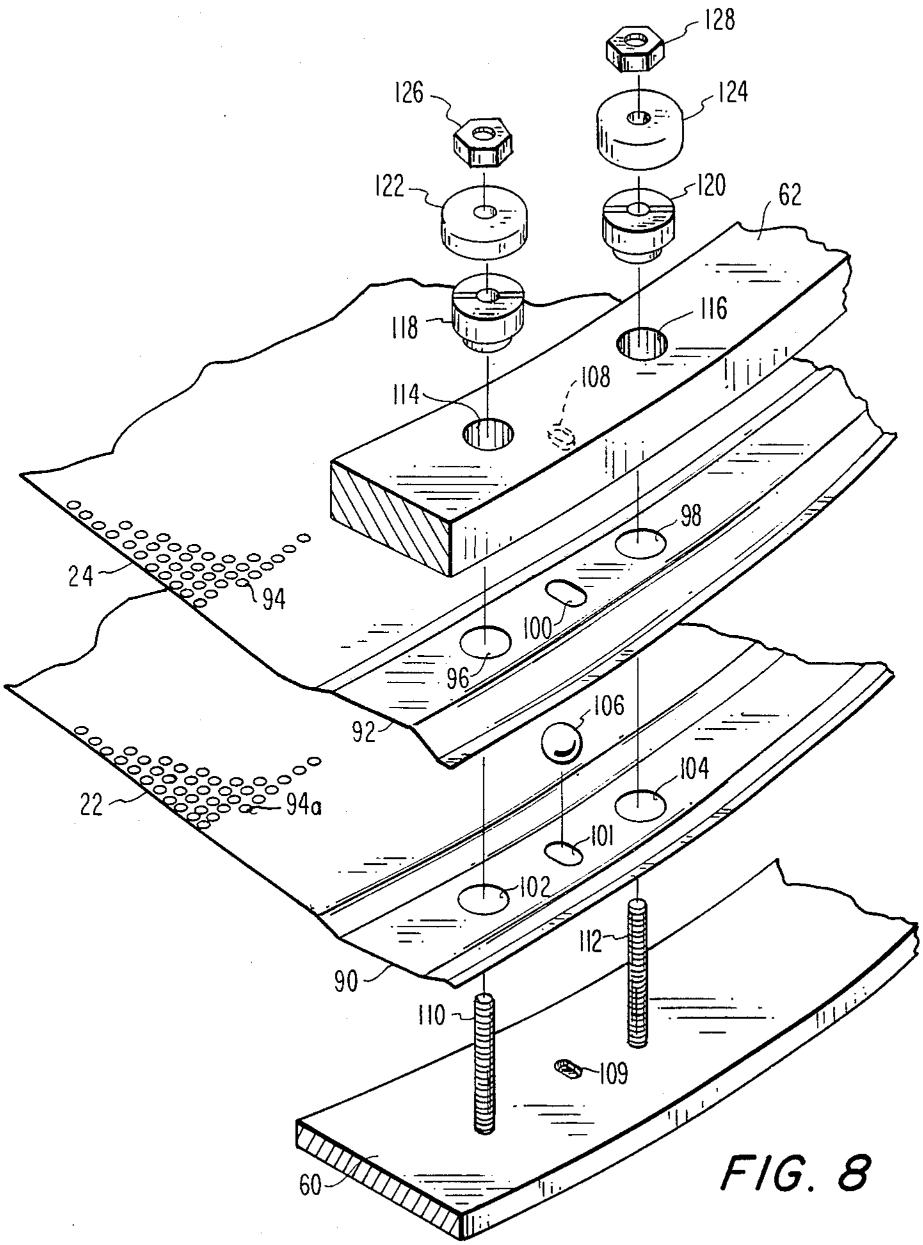
FIG. 8 is a framentary isometric view of a portion of the ion source indicated more generally in FIG. 3 but with the parts exploded apart.

Turning now to FIG. 8, grids 22 and 24 are each formed of a conductive material such as molybdenum. Importantly, they have integrally formed peripheral marginal portions or rims 90 and 92, respectively, which have approximately the same thicknesses as those of the central portions inside the marginal portions or rims. Inside marginal portions 90 and 92 are in each case an array of apertures as at 94 in FIG. 8. Apertures 94 are distributed in a predetermined pattern. In this particular case, for an ion source beam diameter of thirty-eight centimeters, some 20,000 apertures are contemplated within each of the two grids 22 and 24.

While the drawings indicate what amounts to a circular structure, and hence a circular arrangement of the pattern of apertures 94 in the grids, this is not a necessary limitation. For providing a pattern of ion impingement, say, of an elongated rectangular formation, it may be necessary to rearrange the distribution of apertures in accordance with new dimensional requirements. With such a change, the term "radially" as used hereinafter would mean from the center of the screens in a direction across the respective rims. Should that happen, it will involve an adaptation, such as the change in cathode ray tubes from the original round to the rectangular format, a field wherein a large number of apertures had to be accurately aligned with an array of clusters of phosphor spots or triads.

Looking at FIG. 8, it will be observed that the integral outer rim of accelerator grid 24 has been deformed at 92 to be spaced more away from the outer rim 90 of grid 22. At the same time, the integrally formed outer rim of grid 22, again of molybdenum, has, in the sense of reference between the two grids, been spaced outwardly in the other direction as shown at 90 in order to define a space between the two grids.

In rim 92 is a succession of holes 96 and 98 through which, as described later, fasteners are located. Between each pair of holes 96 and 98 is an opening 100. Similarly in rim 90 is a succession of holes 102 and 104 individual pairs of which span another succession of corresponding openings 101. A ball-shaped insulator 106 is seated in a between each of those openings.

When assembled, insulators 106 are sandwiched between rim 92 and rim 90 and seated between openings 100 in rim 92 and the corresponding openings 101 in rim 90. Openings 100 and 101 are so sized that each ball protrudes through the rim partway into, and in contact with, corresponding slots 108 and 109 in support 62 and clamp 60. Openings 100 and 101 are slightly elongated in the radial direction as to permit relative radial motion between rims 90 and 92 without insulators 106 becoming unseated. Thus, the balls ensure alignment of the two grids as deformation, flexing and whatever else may occur with heating and cooling. At the same time, buckling and other injury to the grids is prevented because rims 90 and 92 are allowed to slide radially between clamp 60 and support elements 62. While the illustrated ball insulator 106 might be of any of several different materials, in the present embodiment it is formed of alumina, to have mechanical strength, as well as to work at the high operating temperatures therein.

Preferably, slot 108 also is radially elongated as formed in the undersurface of support element 62 which faces rim 92 and is in alignment with that portion of ball 106 which protrudes through opening 100. Exactly the same, slot 109 is radially elongated as formed in the inner surface of clamp 60 upon which rim 90 slides. In turn, it receives the portion of ball 106 which protrudes through the opening 101 beneath that ball.

In the vacuum environment in which these parts operate, heat transfer is almost entirely by radiation, and separate parts normally develop substantial temperature differences, even between those parts that are in nominal contact with each other. Without freedom to move, thermal expansion can easily develop forces that exceed the yield strength of the materials used. This is the reason why rims 90 and 92 are formed integral with grids 22 and 24. Further, differences in thickness will result in different rates of heating and cooling in different portions of the same part. The rims are therefore of approximately the same thickness as the inner portions of the grids where apertures 94 and 94*a* are located. In a large ion source with closely spaced grids, such as that illustrated, the grids must be thin enough so that rims 90 and 92 will require a separate supporting structure (support 62 and clamp 60) to provide the necessary stiffness. It should be further noted that the presence of support 62 and clamp 60 will reduce the radiation loss from rims 90 and 92, thereby reducing the radial temperature difference in grids 22 and 24 and the resulting thermal distortion of the grids.

Thus, the two rims 90 and 92 are held so that the centers of the grids are maintained in alignment, spacing between the two grids is maintained, and the relative circumferential orientation between the two grids is maintained. At the same time, relative radial expansion is permitted between any of support 62, clamp 60 and rims 90 and 92 due to temperature differences that may exist between any of them.

In principle, clamp 60 may be secured to support 62 in almost any manner. In the present embodiment, however, that is neatly accomplished by use of bolts 110 and 112 which extend from clamp 60, through respective openings 102 and 104 in the offset portion of rim 90, and through openings 96 and 98 in the offset portion of rim 92 and on through respective openings 114 and 116 correspondingly spaced in succession around support element 62. Bolts 110 and 112 pass through respective insulative bushings 118 and 120, the lower portions of which are seated in openings 114 and 116 and which are then covered by respective sputter cups 122 and 124 with the bolts finally being secured between plate 62 and clamp 60 by respective nuts 126 and 128.

Figure 9:
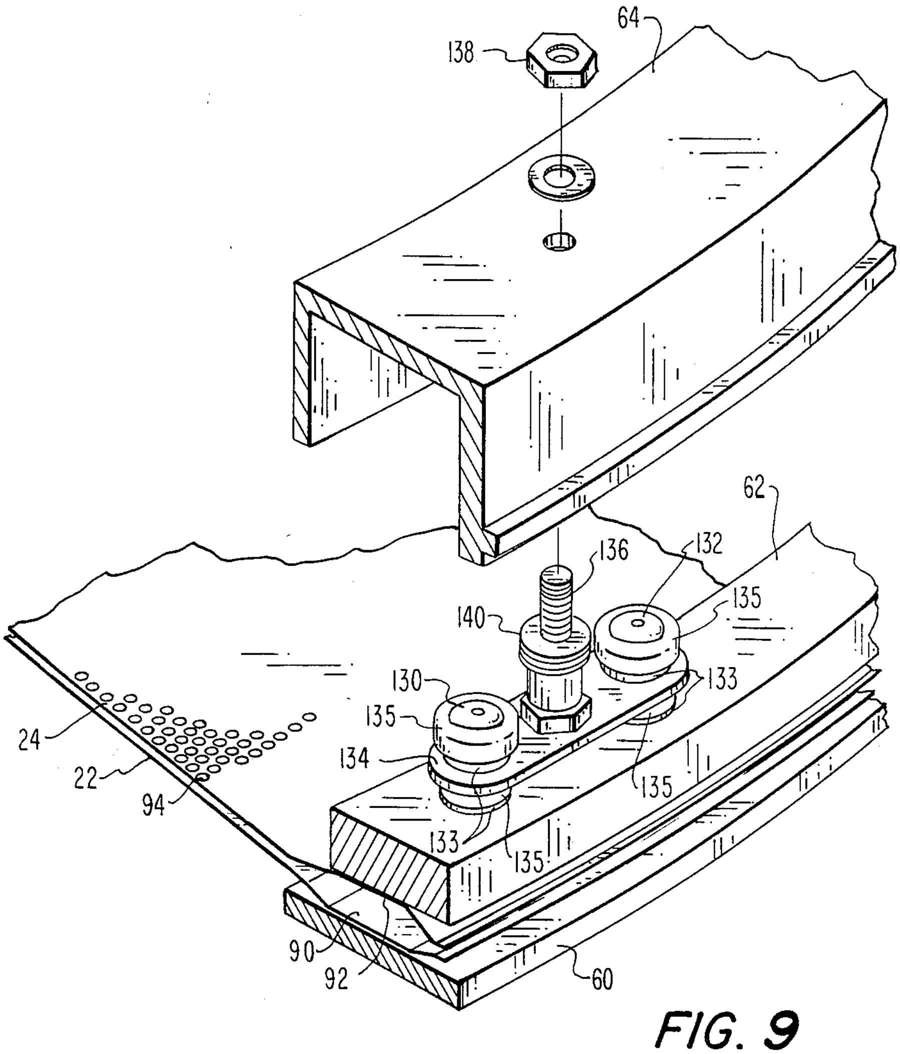
FIG. 9 is a view similar to FIG. 8 but taken at another circumferential location to show the mounting of another component.

FIG. 9 details the mounting of sputter cover 64. Sputter cover 64 serves both to further protect the insulative bushings thereby covered from conductive coatings and to prevent discharges to the combination of fastener parts that includes nuts 126 and 128, bolts 110 and 112, and sputter cups 122 and 124 (all shown in FIG. 8). In the configuration shown, all those parts are at the potential of screen grid 22 and would draw large electron currents if exposed to the charge exchange plasma surrounding the ion beam.

FIG. 9 looks to be similar to FIG. 8. However, it is taken of a section of the perimeter circumferentially-spaced from that shown in FIG. 8.

In FIG. 9, button-head screws 130 and 132 are threaded into support 62, thereby holding four insulative bushings 133 which in turn hold strap 134. Strap 134 is thereby held in location by, but electrically insulated from, screws 130 and 132. Four sputter cups 135 serve to protect insulative bushings 133 from the deposition of conductive films. Upstanding from strap 134 is a mounting bolt 136, over which cover 64 is held in place by a nut 138. The number of washers 140 can be adjusted to allow careful positioning of cover 64 relative to grids 22 and 24.

The structure shown in FIG. 8 is repeated several times around rims 90 and 92, and assures the relative placement of support 62, clamp 60 and grids 22 and 24. The structure shown in FIG. 9 is also repeated several times around the rims, at different locations from the structure shown in FIG. 8. It provides for the mechanical attachment of sputter cover 64 to support 62, while at the same time providing electrical insulation between the sputter cover and the support. In this manner sputter cover 64 can be supported by, and electrically connected to, outer shell 12 (see FIG. 2) which is at facility ground, without affecting the electrical potentials of grids 22 and 24.

Numerous variations from that specifically shown are possible at least in some embodiments. For example, slots 108 and 109 as indicated in FIG. 8 may be formed entirely through respective clamp 60 and support 62. That approach is implied in FIG. 10. Openings 100 and 101 may not be actual holes; they may be depressed areas which, in turn, are seated in respective slots 108 and 109 with the balls themselves seated only in the depressions.

In the embodiments illustrated, however, the relative dimensions are such that, during the onset of clamping, the ball first engages the edges of openings 100 and 101. That forces circumferential alignment of the grids, while still allowing relative radial movement therebetween. Increasing clamping force then causes the balls to engage the edges of slots 108 and 109. That engagement causes all of clamp 60, support 62, grid 22 and grid 24 to be pulled into mutual overall alignment.

That approach allows for compensation of minor manufacturing tolerance variations. While alignment of the grid apertures needs to be as perfect as possible, and here with less than 0.002 inch difference, the tolerances for alignment of clamp 60 and support 62. are not as tight.

Of course, differences in overall size and in specific details of approach will necessitate changes in dimensions, that discussed being by way of a specific example of a thirty-eight centimeter source as illustrative. There are eight sets of the FIG. 8 assemblies and also an interspersed eight sets of insulative mounting assemblies for sputter cover 64 as in FIG. 9.

In that specific case, balls 106 have a diameter of 0.28 inch. Openings 100 and 101 each have an elongated shape with ends formed to have a radius of 0.108 inch. Slots 108 and 109 each have such end radii of 0.090 inch. This allows balls 106, on clamping, to engage the edges of openings 100 and 101 before engaging the edges of slots 108 and 109 when rims 90 and 92 have a thickness of 0.020 inch.

Figure 10:
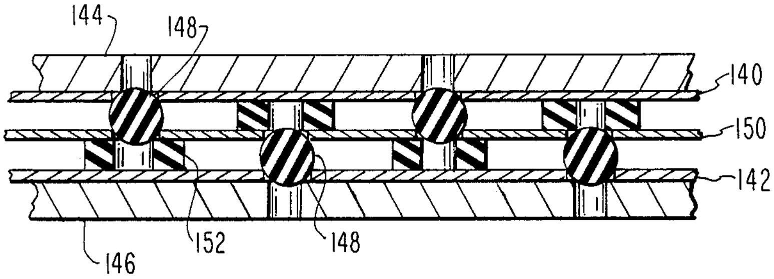
FIG. 10 is a pictorial illustration of an alternative to the kind of assembly generally shown in FIG. 8.

FIG. 10 depicts a three-grid alternative to the two-grid structure shown in FIG. 8. Seated between a support element 144 and a clamp 146 are insulating elements 148 that are outwardly disposed as between an inner grid 150 and each of the two other grids 140 and 142. Flat insulators 152 maintain the spacings between the grids and also define the openings in which insulators 148 are allowed to roll or slide. Note that flat insulators 152 are free to slide on the surfaces opposite insulators 148. Flat insulators 152 thus maintain the grid spacings, while insulators 148 both maintain the grid spacings and maintain the grid alignments.

While spherical insulators have been shown in FIGS. 8 and 10, it is possible to use cylindrical insulators instead, or any other shape which provides precision alignment. The straight portions of openings 100, 101, 108 and 109 in FIG. 8, for example, may be extended sufficiently to permit use of a cylindrical insulator, with the axis of the insulator extending radially out from the center of the grids. With such cylindrical insulators, relative radial motion is accommodated by a sliding motion, rather than the rolling motion that may result when spherical insulator.are used.

While a particular embodiment of the invention has been shown and described, and certain alternatives have been mentioned, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. In an ion source having a chamber wherein ions are produced and propelled outwardly through at least a pair of grids having a mutually-aligned respective plurality of apertures, a grid assembly comprising:

first and second grids each of conductive material having an integrally-formed peripheral marginal portion and having, inside said marginal portion, an array of apertures distributed in a predetermined pattern;

a support element having a shape which matches that of and is mounted over the side of the marginal portion of said first grid facing away from said second grid;

a clamp having a shape which matches that of and is mounted over the side of the marginal portion of said second grid facing away from said first grid;

means for securing said clamp to said support element with said marginal portions sandwiched thereinbetween and respectively positioned to mutually align the respective ones of said apertures in said first and second grids;

means defining a first and second mutually aligned series of seats successively spaced around respective ones of said marginal portions;

and means, including a plurality of insulators each having a circular cross section and individually seated in and between corresponding ones of said first and second series of seats, for enabling radial movement of said marginal portions relative to each other and relative to said support element and said clamp.

2. An ion source as defined in claim 1 in which each of said seats in a circular opening in which a corresponding one of said insulators is substantially confined while partially protruding therethrough and against corresponding ones of said support element and clamp.

3. An ion source as defined in claim 2 in which each of said circular openings is elongated in a direction radially of the respective grid and across the respective marginal portion.

4. An ion source as defined in claim 3 which further includes means defined a first and second series of mutually aligned series of slots successively spaced around respective ones of said support element and said clamp and individually on the corresponding sides thereof facing said marginal portions.

5. An ion source as defined in claim 4 in which each of said slots is elongated in a direction radially of said grids and across said marginal portions.

6. An ion source as defined in claim 5 in which the respective diameter of said insulators and the dimensions of said openings and said slots are selected so that, as said clamp is tightened toward said support element, said insulators first engage and seat firmly in said openings and thereafter engage firmly in said slots.

7. An ion source as defined in claim 1 in which a third one of said apertured grids is included between said first and second grids, insulating spacers are included to separate the marginal portion of said third grid from said first and second grids and the marginal portion of said third grid also has a matching series of seats spaced successively therearound to correspondingly cooperate with respective different ones of said insulators in permitting radial movement of all of said grids, both relative to each other and relative to said clamp and said support.

8. An ion source as defined in claim 1 in which said securing means includes fastener means which includes parts which extend entirely through said clamp, said marginal portions and said support element.

9. An ion source as defined in claim 8 in which portions of said fastener parts face in the downstream direction of the flow of said ions, and in which a cover protective against sputtered material covers each of said fastener parts.

10. An ion source as defined in claim 1 in which each of said insulators is of spherical shape.

11. An ion source as defined in claim 1 which further includes a cover of a shape matching that of said marginal portions and secured to overlie the one of said support element and clamp which faces downstream in the ion flow from said grids.

12. An ion source as defined in claim 1 in which said first and second grids are of mutually parallel dished shapes within their respective marginal portions.

13. An ion source as defined in claim 1 in which said marginal portion of at least one of said grids is laterally offset from the remainder of said grid.

14. An ion source as defined in claim 13 in which the marginal portions of both of said grids are each laterally offset from the remainder of its respective grid but each in a direction opposite from the other, and in which said insulators are disposed between the offsets.

15. An ion source as defined in claim 13 in which said offset is formed so as to protect said insulators from the deposition of conductive films, either from material sputtered from external to the said grids or from the surfaces of said grids near said array of apertures that are subjected to the impingement of energetic ions.

16. An ion source as defined in claim 1 in which said clamp and said support element both serve as radiation shields for said marginal portions, thereby reducing the heat loss from said marginal portions and the otherwise resulting radial temperature differences in said grids that tend to cause distortion therein.

17. An ion source as defined in claim 1 in which said marginal portions each have at least substantially the same thicknesses as the remainder of the respective grid.

* * * * *

UNITED STATES PATENT AND TRADEMARK OFFICE
CERTIFICATE OF CORRECTION

PATENT NO. : 4,873,467
DATED : October 10, 1989
INVENTOR(S) : Harold R. Kaufman, et al.

It is certified that error appears in the above-identified patent and that said Letters Patent is hereby corrected as shown below:

Title page:

UNDER "OTHER PUBLICATIONS"

First column, last line: "Gridson" should read -- Grids on --.

Second column, fourth line: "Collet t" should read -- Collett --.

IN THE BODY OF THE PATENT

Column 3, line 32: after "positive", should read -- terminal --.

Column 5, line 44: "a" should read -- and --.

Column 8, line 53: "in" (first occurance) should read -- is --.

UNITED STATES PATENT AND TRADEMARK OFFICE
CERTIFICATE OF CORRECTION

PATENT NO. : 4,873,467

DATED : October 10, 1989

INVENTOR(S) : Harold R. Kaufman, et al

It is certified that error appears in the above-identified patent and that said Letters Patent is hereby corrected as shown below:

Column 8, line 62: "defined" should read--defining--.

Signed and Sealed this

Eighth Day of May, 1990

Attest:

HARRY F. MANBECK, JR.

*Attesting Officer*

*Commissioner of Patents and Trademarks*